United States Patent [19]
Williams

[11] Patent Number: 5,860,156
[45] Date of Patent: Jan. 12, 1999

[54] METHOD FOR IMPLEMENTING AN INDEXED JUMP TABLE

[75] Inventor: Jeffrey L. Williams, Rochester, Minn.

[73] Assignee: Western Digital Corporation, Irvine, Calif.

[21] Appl. No.: 686,814

[22] Filed: Jul. 26, 1996

[51] Int. Cl.$^6$ .................................................. G06F 13/42
[52] U.S. Cl. ........................ 711/221; 395/285; 395/309; 707/509
[58] Field of Search ..................................... 395/285, 309, 395/800, 325; 707/509; 711/221

[56] References Cited

U.S. PATENT DOCUMENTS

| | | | |
|---|---|---|---|
| 4,302,820 | 11/1981 | Struger et al. | 364/900 |
| 5,265,206 | 11/1993 | Shackelford et al. | 395/200 |
| 5,406,644 | 4/1995 | MacGregor | 395/500 |
| 5,430,836 | 7/1995 | Wolf et al. | 395/155 |
| 5,463,743 | 10/1995 | Galloway | 395/285 |

*Primary Examiner*—Meng-Ai T. An
*Assistant Examiner*—Jigar Pancholi
*Attorney, Agent, or Firm*—Leo J. Young, Esq.; Milad G. Shara, Esq.

[57] ABSTRACT

A method for processing interface messages, such as SCSI messages, using an indexed jump table. Two single-dimensional tables are implemented by the method described. The first table stores index values for all valid sequence instruction locations for which an ATN signal can be detected. The second table stores index values for all valid interface messages. The index values of these two tables are used as entry points to the indexed jump table whose elements contain addresses to message handling functions.

5 Claims, 7 Drawing Sheets

| | 510.1 | 510.6 | 510.7 | 510.13 | 510.14 |
|---|---|---|---|---|---|
| 520.0 → | F0 | F0 | F0 | F0 | F0 |
| 520.1 → | F1 | F3 | F4 | F3 | F5 |
| 520.4 → | F1 | F2 | F5 | F7 | F3 |
| 520.5 → | F1 | F4 | F3 | F7 | F2 |
| 520.6 → | F1 | F6 | F2 | F5 | F7 |
| 520.7 → | F1 | F2 | F2 | F4 | F8 |
| 520.8 → | F1 | F1 | F5 | F5 | F8 |
| 520.9 → | F1 | F6 | F6 | F3 | F5 |
| 520.12 → | F2 | F2 | F2 | F2 | F2 |
| 520.14 → | F8 | F4 | F5 | F3 | F4 |
| 520.18 → | F4 | F5 | F6 | F2 | F8 |

INDEXED, DENSE JUMP TABLE

Fig. 1
(Prior Art)

| SEQ. INST.LOC. | CONSTANT |
|---|---|
| 1 | SWANEXUS0 |
| 2 | XX |
| 3 | XX |
| 4 | XX |
| 5 | XX |
| 6 | SWACHKQC |
| 7 | SWABADQ |
| 8 | XX |
| 9 | XX |
| 10 | XX |
| 11 | XX |
| 12 | XX |
| 13 | SWABADNEXUS |
| 14 | SWACHKID |

210.1 → (row 1)
210.2 → (row 2)
210.3 → (row 3)
210.4 → (row 4)
210.5 → (row 5)
210.6 → (row 6)
210.7 → (row 7)
210.8 → (row 8)
210.9 → (row 9)
210.10 → (row 10)
210.11 → (row 11)
210.12 → (row 12)
210.13 → (row 13)
210.14 → (row 14)

Fig. 2

SEQUENCER INSTRUCTIONS
(Prior Art)

| MESSAGE # (hex) | MESSAGE |
|---|---|
| 00h | COMMAND COMPLETE |
| 01h | EXTENDED MESSAGE |
| 02h | SAVE DATA POINTER |
| 03h | RESTORE POINTERS |
| 04h | DISCONNECT |
| 05h | INITIATOR DETECTED ERROR |
| 06h | ABORT |
| 07h | MESSAGE REJECT |
| 08h | NO OPERATION |
| 09h | MESSAGE PARITY ERROR |
| 0Ah | LINKED COMMAND COMPLETE |
| 0Bh | LINKED COMMAND COMPLETE (WITH FLAG) |
| 0Ch | BUS DEVICE RESET |
| 0Dh | ABORT TAG |
| 0Eh | CLEAR QUEUE |
| 0Fh | INITIATE RECOVERY |
| 10h | RELEASE RECOVERY |
| 11h | TERMINATE I/O PROCESS |
| 12h | CONTINUE IOP |

Fig. 3
SCSI MESSAGES
(Prior Art)

Fig. 4
SPARSE JUMP TABLE
(Prior Art)

| | |
|---|---|
| 510.1 → INDEX TABLE ELEMENT 1 | 1 |
| 510.2 → INDEX TABLE ELEMENT 2 | 0 |
| 510.3 → INDEX TABLE ELEMENT 3 | 0 |
| 510.4 → INDEX TABLE ELEMENT 4 | 0 |
| 510.5 → INDEX TABLE ELEMENT 5 | 0 |
| 510.6 → INDEX TABLE ELEMENT 6 | 2 |
| 510.7 → INDEX TABLE ELEMENT 7 | 3 |
| 510.8 → INDEX TABLE ELEMENT 8 | 0 |
| 510.9 → INDEX TABLE ELEMENT 9 | 0 |
| 510.10 → INDEX TABLE ELEMENT 10 | 0 |
| 510.11 → INDEX TABLE ELEMENT 11 | 0 |
| 510.12 → INDEX TABLE ELEMENT 12 | 0 |
| 510.13 → INDEX TABLE ELEMENT 13 | 4 |
| 510.14 → INDEX TABLE ELEMENT 14 | 5 |

Fig. 5A

SEQUENCER INSTRUCTIONS
INDEX TABLE

| | | |
|---|---|---|
| 520.0 → | INDEX TABLE ELEMENT 0 | 0 |
| 520.1 → | INDEX TABLE ELEMENT 1 | 1 |
| 520.2 → | INDEX TABLE ELEMENT 2 | 0 |
| 520.3 → | INDEX TABLE ELEMENT 3 | 0 |
| 520.4 → | INDEX TABLE ELEMENT 4 | 2 |
| 520.5 → | INDEX TABLE ELEMENT 5 | 3 |
| 520.6 → | INDEX TABLE ELEMENT 6 | 4 |
| 520.7 → | INDEX TABLE ELEMENT 7 | 5 |
| 520.8 → | INDEX TABLE ELEMENT 8 | 6 |
| 520.9 → | INDEX TABLE ELEMENT 9 | 7 |
| 520.10 → | INDEX TABLE ELEMENT 10 | 0 |
| 520.11 → | INDEX TABLE ELEMENT 11 | 0 |
| 520.12 → | INDEX TABLE ELEMENT 12 | 8 |
| 520.13 → | INDEX TABLE ELEMENT 13 | 4 |
| 520.14 → | INDEX TABLE ELEMENT 14 | 9 |
| 520.15 → | INDEX TABLE ELEMENT 15 | 0 |
| 520.16 → | INDEX TABLE ELEMENT 16 | 0 |
| 520.17 → | INDEX TABLE ELEMENT 17 | 0 |
| 520.18 → | INDEX TABLE ELEMENT 18 | 10 |

Fig. 5B
MESSAGE INDEX TABLE

|  | 510.1 | 510.6 | 510.7 | 510.13 | 510.14 |
|---|---|---|---|---|---|
| 520.0 → | F0 | F0 | F0 | F0 | F0 |
| 520.1 → | F1 | F3 | F4 | F3 | F5 |
| 520.4 → | F1 | F2 | F5 | F7 | F3 |
| 520.5 → | F1 | F4 | F3 | F7 | F2 |
| 520.6 → | F1 | F6 | F2 | F5 | F7 |
| 520.7 → | F1 | F2 | F2 | F4 | F8 |
| 520.8 → | F1 | F1 | F5 | F5 | F8 |
| 520.9 → | F1 | F6 | F6 | F3 | F5 |
| 520.12 → | F2 | F2 | F2 | F2 | F2 |
| 520.14 → | F8 | F4 | F5 | F3 | F4 |
| 520.18 → | F4 | F5 | F6 | F2 | F8 |

Fig. 5C

INDEXED, DENSE JUMP TABLE

METHOD FOR IMPLEMENTING AN INDEXED JUMP TABLE

FIELD OF THE INVENTION

The present invention relates to computer networks, and in particular to an improved jump table for handling function calls based on network messages.

BACKGROUND

A parallel I/O bus provides a peer-to-peer interface among a network of computers and peripheral devices, such as disk drives and CD-POM drives. One such parallel I/O bus, the Small Computer Standard Interface (SCSI), became an ANSI standard in 1986 under the title X3.131-1986. SCSI-1, the subject of this ANSI standard has been enhanced by the introduction of SCSI-2.

A SCSI system consists of one or more initiators, which are able to issue commands on the SCSI bus, and one or more targets, which perform commands received from an initiator. For example, an initiator could be a CPU of a computer system. This initiator might issue commands via the SCSI bus to a disk drive. The disk drive would be the target Activity by initiators and targets on the SCSI bus is accomplished by an eight-phase transaction cycle, consisting of the phases named: BUS FREE, ARBITRATION, SELECTION, RESELECTION, COMMAND, DATA, STATUS, and MESSAGE.

A SCSI bus cycle begins in the BUS FREE phase. In the ARBITRATION phase, the devices needing access to the bus vie to gain control it. The device with the highest SCSI ID is given control. Then in the SELECTION phase, an initiator which has been given control, chooses its target device. Alternatively, in the RESELECTION phase, a target which has been given control and which needs to reconnect to an initiator, chooses the initiator device.

The lag four phases (COMMAND, DATA, STATUS and MESSAGE) are collectively known as the information transfer phase. In the COMMAND phase, a target device requests a command from an initiator device. Data is transferred in the set of DATA phases. In the STATUS phase, a single status byte is sent by the target to the initiator. This status byte indicates whether or not the SCSI command has been successfully completed. In the final phase of a SCSI command, a "command complete" message is sent from the target to the initiator to indicate that the SCSI command has completed. Messages are also used by an initiator to indicate some abnormal event on the SCSI bus. An initiator may assert the ATN signal during SCSI information transfer phases to indicate a desire to send a SCSI message to the target. This may occur during any information transfer phase.

In some sequencer-based implementations of a SCSI system, once a message is received in the MESSAGE phase, a subroutine is called in order to provide further processing. The subroutine called is based upon the location of the sequencer instruction in the sequencer code area (hereafter referred to as sequencer instruction location) which was being executed when the ATN signal was detected and the message that was received by the target in response to the AIN signal. The subroutine calls can be implemented in various ways. One implementation used to decide which subroutine should be called involves a series of checks For example, nested IF-statements could branch to a subroutine based on the results of several compound IF-statements, such as:

```
IF SEQUENCER_INSTRUCTION_LOCATION_1 THEN
  IF MESSAGE_1 THEN GOSUB SUBROUTINE_1
  ELSE IF MESSAGE_2 THEN GOSUB SUBROUTINE_2
    ELSE IF MESSAGE_3 THEN GOSUB SUBROUTINE_3
    END_IF
  END_IF
ELSE IF SEQUENCER_INSTRUCTION_LOCATION_2 THEN
  IF MESSAGE_1 THEN GOSUB SUBROUTINE_4
  ELSE IF MESSAGE_2 THEN GOSUB SUBROUTINE_5
  END_IF
END_IF
```

An alternative implementation of supporting these subroutine calls is by using a jump table. Jump tables are two dimensional arrays by which a jump to a subroutine is determined by the array's coordinates. In the preceding example, the x-coordinate of an array could correspond to the sequencer instruction location and the y-coordinate could represent the message. The contents of any element in the array, referenced by an x-axis sequencer instruction location and a y-axis message, is the appropriate subroutine call.

However, jump tables have disadvantages. A primary disadvantage is memory usage. A jump table whose dimensions are referenced by the set of sequencer instruction locations and the set of messages wastes memory if not all sequencer instruction locations are paired with messages, if not all messages are supported as valid messages, or if the actions to be taken for different messages is identical. In these situations, the jump table is a sparse table. The table entries which do not provide an address of a subroutine function are superfluous. What is needed in the art is a way to decrease the memory consumption of such a sparse jump table. The enhanced jump table should require a minimum amount of memory and yet offer ease of implementation without significant degradation in performance.

SUMMARY OF THE INVENTION

A method for processing interface messages using an indexed jump table. Two single-dimensional tables are implemented. The first table stores index values for all valid sequence instruction locations for which an AIN can be detected The second table stores index values for all valid interface messages. The index values of these two tables are used as entry points to the indexed jump table whose elements contain addresses to message handling functions. Such an indexed jump table can provide a significant savings in memory over non-indexed jump tables having either sparse or duplicated elements.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements having the same number perform essentially the same functions.

Figure 1:
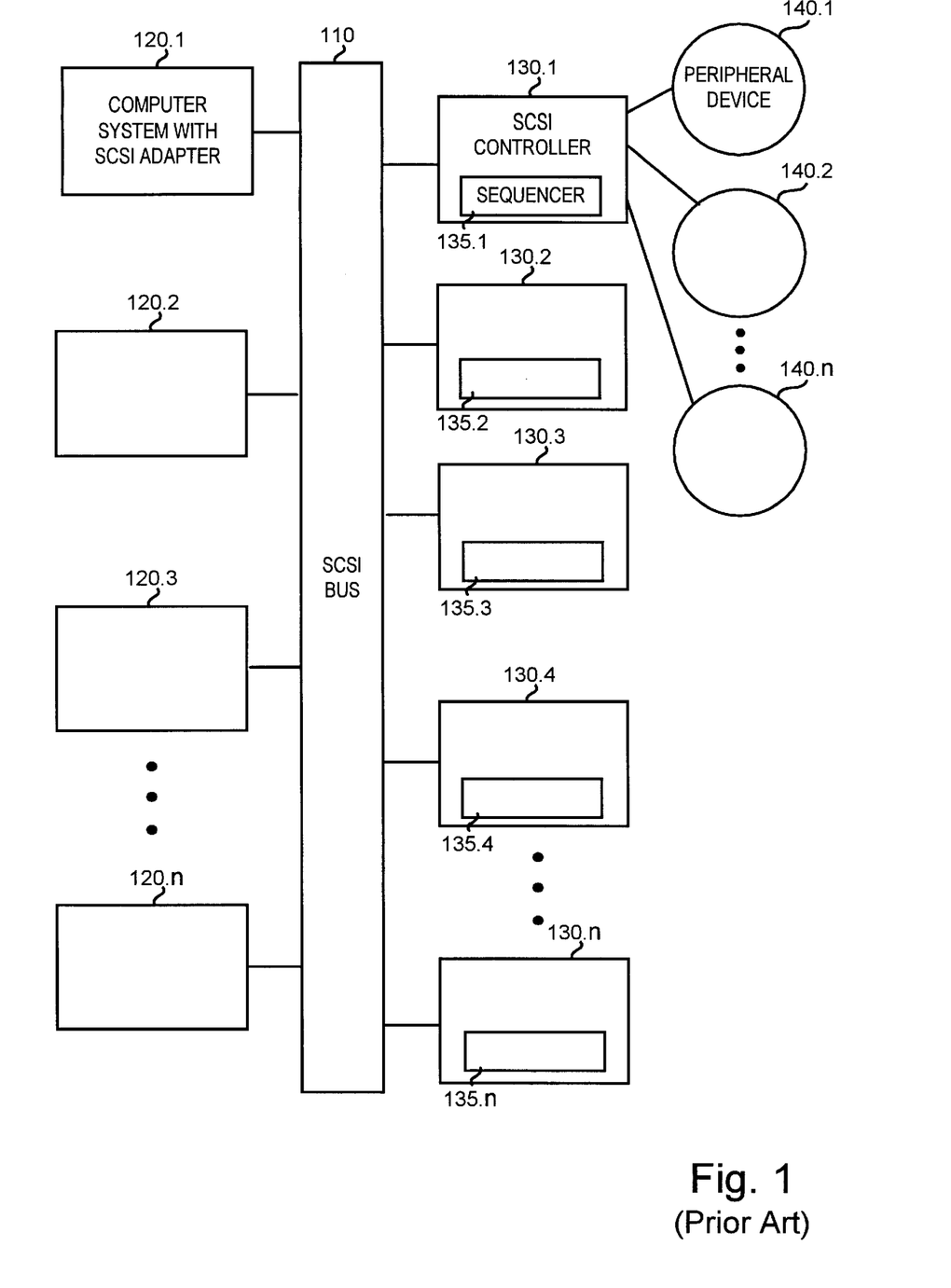
FIG. 1 is a block diagram of a SCSI computer network.

FIG. 1 is a block diagram of a SCSI computer network. SCSI bus 110 interconnects a group of computer systems 120.1 through 120.n and a group of peripheral devices 140.1 through 140.n. Each computer system 120 includes an operating system and each has a SCSI adapter which provides the connection to SCSI bus 110. Peripheral devices 140.1 through 140.u are connected to SCSI bus 110 by one of the SCSI controllers 130.1 through 130.n. Peripheral devices 140.1 through 140.n can be, for example, disk drives, CD-ROM drives or other well known peripheral devices. As is well-known in the art such drives each consist of a disk enclosure, a disk of computer usable media, and a disk drive controller. Peripheral devices 140.1 through 140.n may also have computer readable program code stored thereon. Peripheral devices 140.1 through 140.n can also be modems using telecommunication lines as their usable media. Each SCSI controller 130.1 through 130.n contains a SCSI sequencer 135.1 through 135.n.

Figure 2:
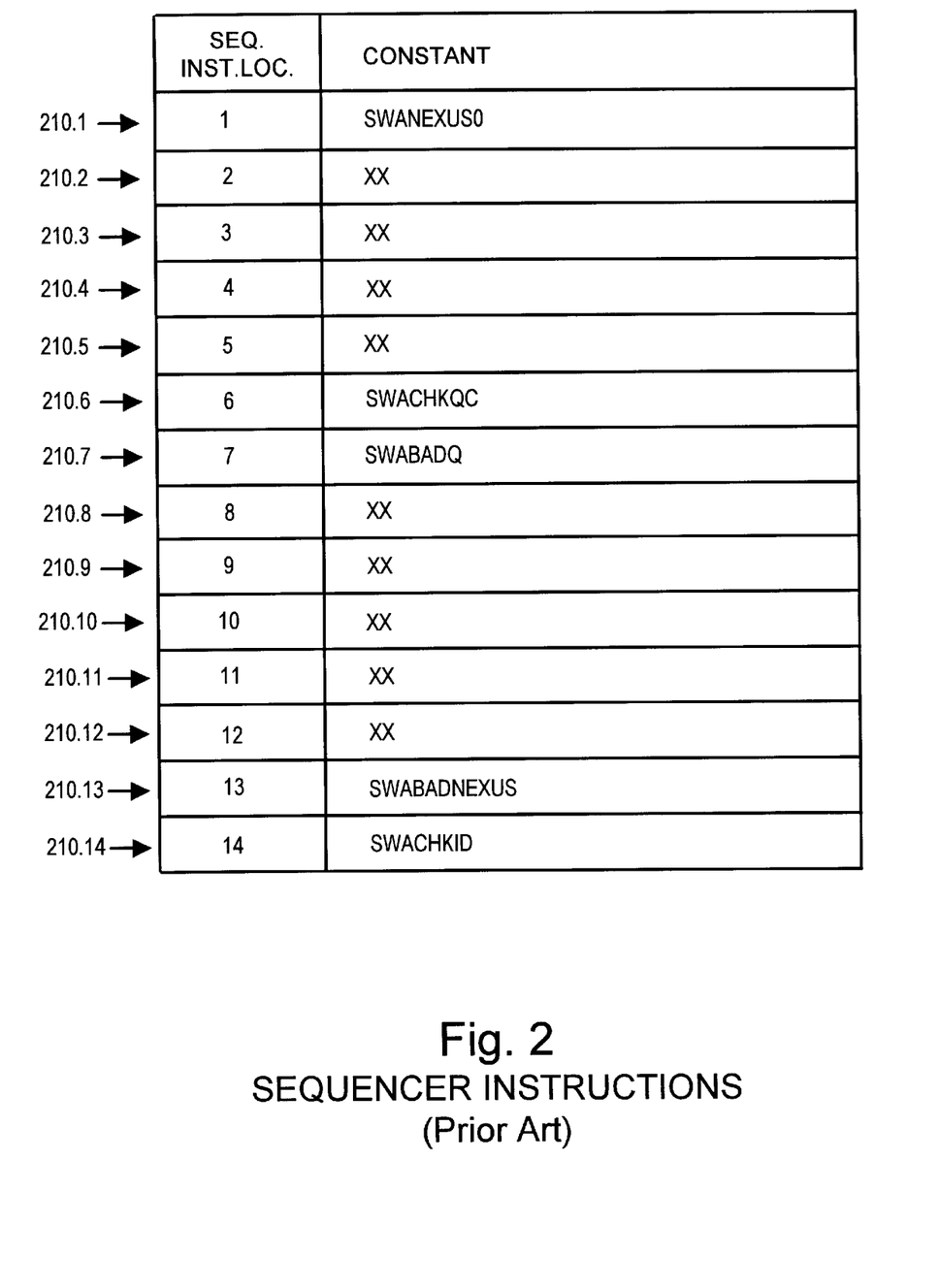
FIG. 2 is a representative list of sequencer instructions used for a SCSI bus.

FIG. 2 is a representative listing of sequencer instructions 210.1 through 210.14 used for SCSI bus 110. These sequencer instructions 210 are used by a sequencer 135 in a SCSI controller 130 to control the SCSI bus 110 given various actions of an initiator. In this abbreviated list of sequencer instructions, the constant SQNEXUSO is equated to sequencer instruction location 1 (see 210.1), the constant SWACHKQC is equated to sequencer instruction location 6 (see 210.6), the constant SWABADQ is equated to sequencer instucion location 7 (see 210.7), the constant SWABADNEXUS is equated to sequencer instruction location 13 (see 210.13), and the constant SWAC:HKJ is equated to sequencer instruction location 14 (see 210.14). The remaining sequencer instruction locations (210.2 through 210.5 and 210.8 through 210.12) are either valid sequencer instruction locations at which ATN assertion cannot be detected or cannot detect ATN because these locations are reserved for future use.

Figure 3:
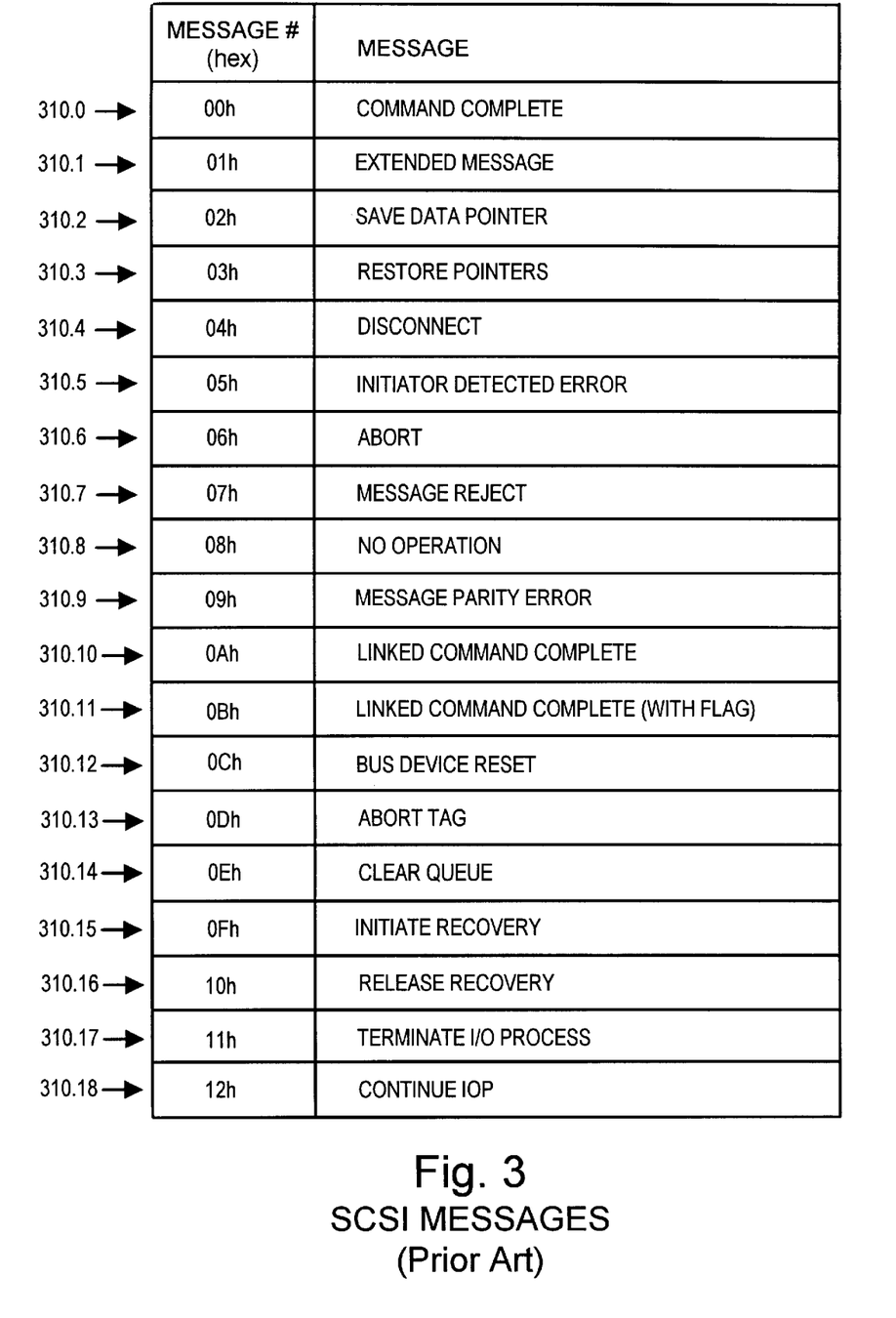
FIG. 3 is a representative listing of messages that can be returned in a SCSI bus system.

FIG. 3 is a representative listing of messages 310.1 through 310.18 that can be sent in a SCSI bus system by either peripheral devices 140 acting as targets or computer systems 120 acting as initiators. For example, the INITIATOR DETECTED ERROR 310.5 message is included in FIG. 3 and is shown to have a hexadecimal message number of 5. Similarly, the CLEAR QUEUE message 310.14 is shown to have a hexadecimal message number of E. Referring to FIG. 3, some possible messages may be treated as invalid 310.0, 310.2, 310.3, 310.10, 310.11, and 310.15 through 310.17. These messages may be treated as invalid because the target chooses not to implement them or because they are messages sent by a target to an initiator. Although only 19 messages are included in FIG. 3, in other embodiments, more or fewer messages can be supported.

Figure 4:
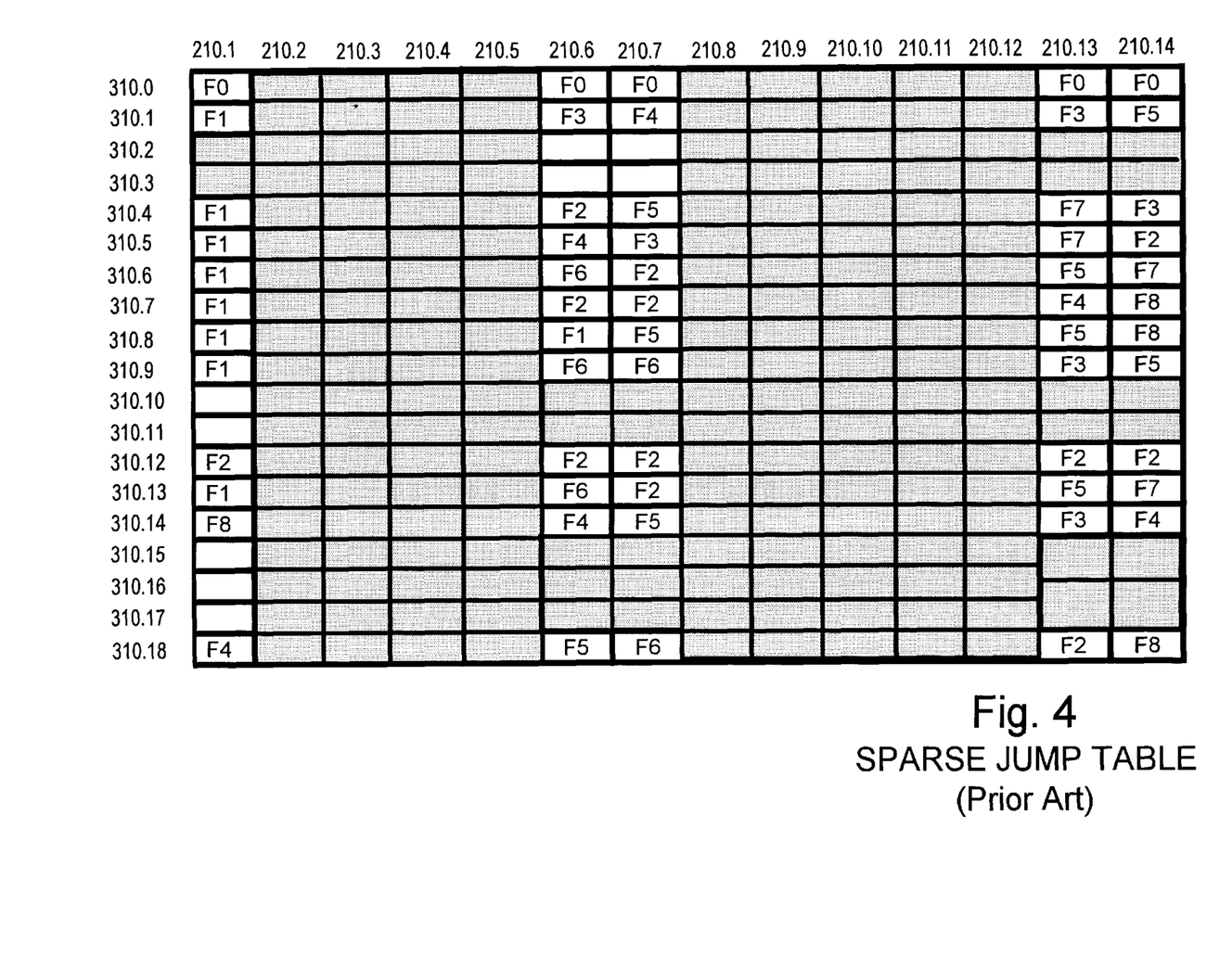
FIG. 4 is a representative diagram of a sparse jump table.

FIG. 4 is a representative diagram of a jump table which corresponds to the sequencer instruction locations 210 and messages 310. Each clement of the jump table holds an address to a message handling function. Possible fractions are represented by F0 through F8 in the table.. Because there are 14 sequencer instruction locations 210.1 through 210.14 and 19 messages 310.0 through 310.18, the jump table shown in FIG. 4 is implemented as a 14-by-19 array. This array has 266 (14×19=266) elements. If each element in the jump table array is a four-byte address, the array uses 1064 bytes of memory (14×19×4=1064).

However, as is shown in FIG. 2, 9 of the 14 sequencer instruction locations are invalid. FIG. 4 shows that 7 of the 19 messages listed in FIG. 3 are invalid. These invalid message and sequencer instruction locations waste memory, making the jump table sparse. In FIG. 4, valid messages and valid sequencer instruction locations account for 60 of the table's entries. Because each table entry is a 4-byte address, only 240 bytes of the table are utilized. Thus, in this example, 240/1064 less than 23% of the memory reserved for the jump table contains useful information (240 bytes+ 1064 bytes=22.5%).

In order to decrease the space wasted by the jump table of FIG. 4, the present invention introduces two indexes supporting a dense jump table. One skilled in the art can implement the indexes and dense jump table as an interface message processor which is hardcoded on a chip or programmed as arrays in software or firmware. The interface message processor can be part of a disk drive controller of a peripheral device 140.n or running from primary storage in a computer system 120.n, as described in connection with FIG. 1.

Figure 5A:
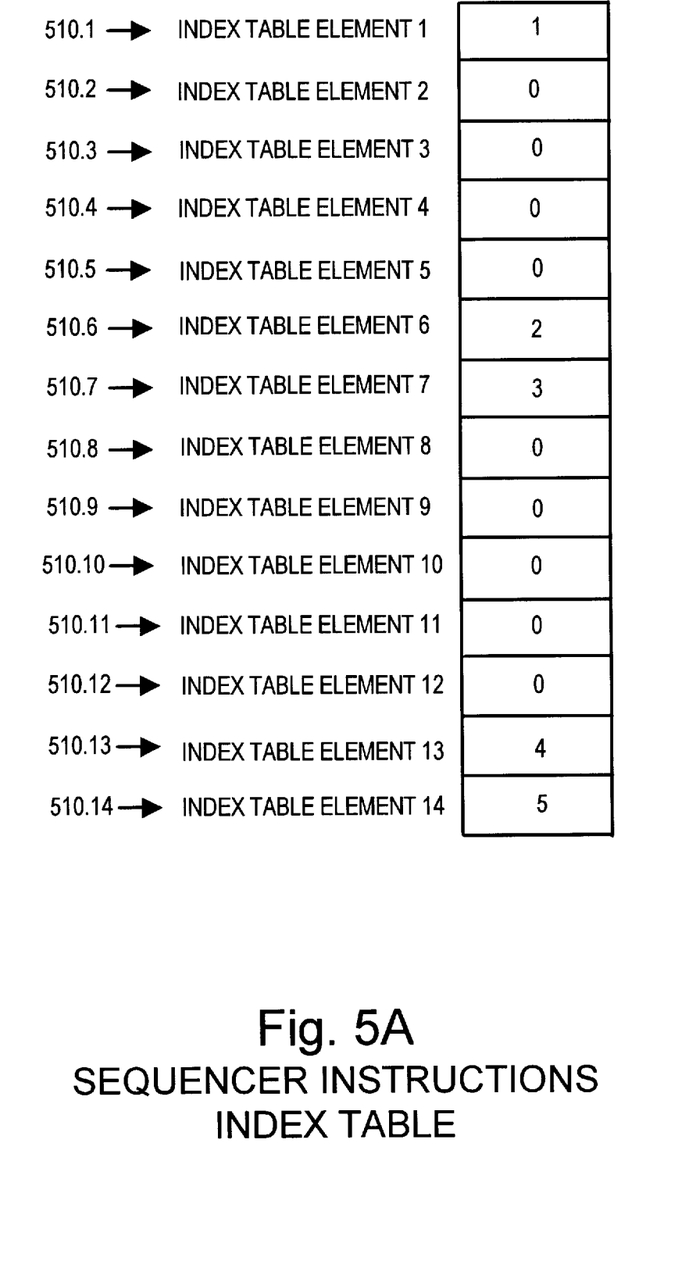
FIG. 5A is a representative listing of a sequencer instruction index table corresponding to FIG. 2.

FIG. 5A is a diagram of a index table of sequencer instruction locations. This table is sized to hold data for each possible sequencer instruction 210.1 through 210.14. Each valid sequencer instruction, i.e., each instruction which can detect ATN and receive a message from SCSI bus 110, is assigned an index value. Thus, sequencer instruction location 6 210.6 is assigned index value 2 as it is the second valid sequencer instruction and sequencer instruction location 14 210.14 is assigned index value 5. In all, there are a total of 5 valid sequencer instruction locations. These are assigned index values through 5.

Figure 5B:
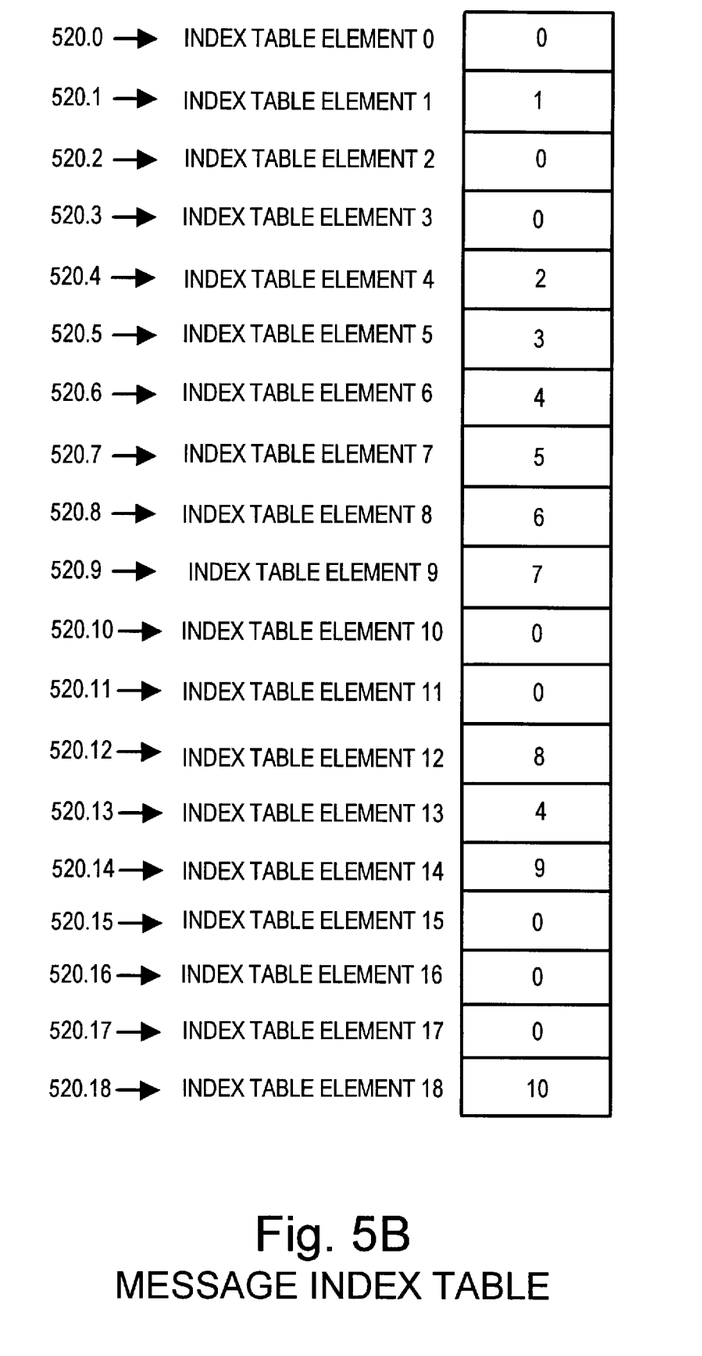
FIG. 5B is a representative listing of a message index table corresponding to FIG. 3.

Similarly, FIG. 5B is a diagram of an index table for the messages from FIG. 3. This table is sized to hold data for each supported message 310.0 through 310.18 and each valid message is assigned an index value. For example, message 12 310.12 is assigned index value 8. Note that there are 11 valid messages, which are assigned index values 0 trough 10. Also note that in this example, message 13 520.13 is to be given the same treatment as message 6 520.06. By giving both messages the same index of 4, the indexed jump table to be described in FIG. 5C is even denser than it would be had message 13 520.13 and message 6 520.06 been duplicated in the table.

Figure 5C:
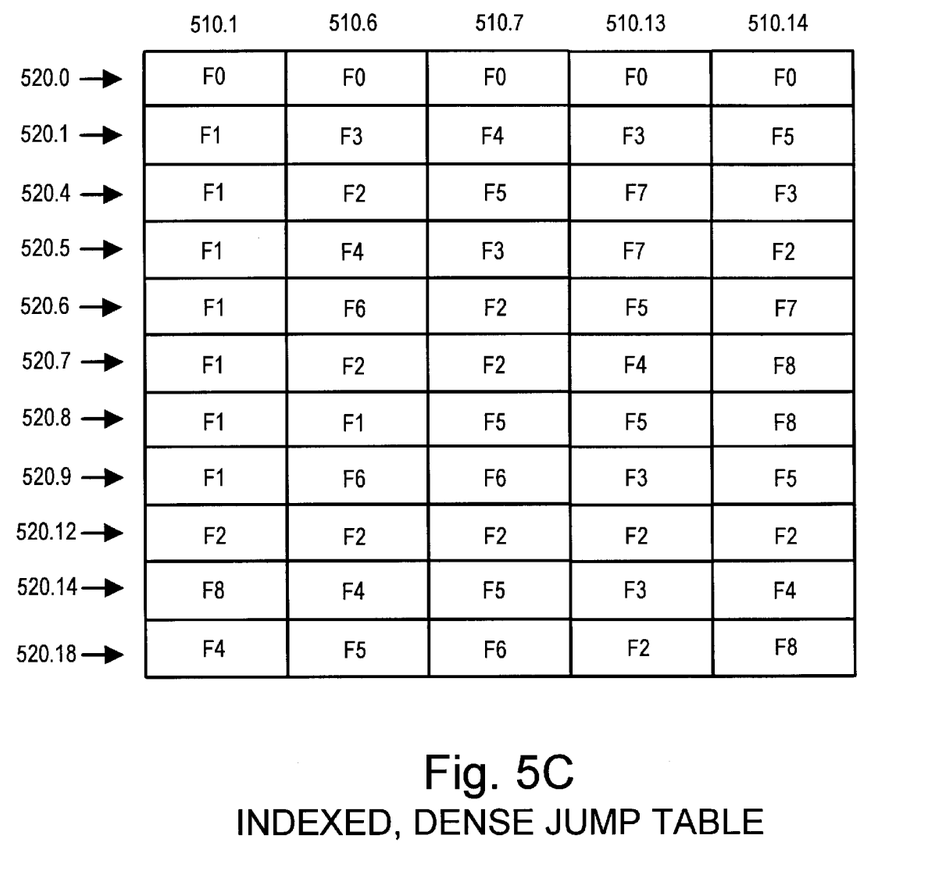
FIG. 5C is a representative diagram of an indexed jump table which is indexed by the tables of FIGS. 5A and 5B.

FIG. 5C is a diagram of a dense jump table which is indexed by the tables of FIGS. 5A and 5B. The indexed jump table is sized to accommodate the 5 valid sequencer instructions and the 11 valid messages. For example, FIG. 5A indicates that the third column of the dense jump table is used for sequencer instruction address 7 (i.e., 510.7 is 3) and FIG. 5B indicates that the second tier (row 3 of this 0-based array) of the dense jump table is used for message id 4 (i.e., 520.4 is 2).

FIGS. 5A, 5B, and 5C provide a memory savings over FIG. 4. FIG. 5A has 14 elements using 56 bytes of memory (14×4=56, assuming four-byte elements). FIG. 5B has 19 elements using 76 bytes of memory 19×4=76). FIG. 5C's 5-by-11 array uses 240 bytes of memory (5×11×4=220). Thus, the method of indexing a dense jump table uses 352 bytes (56+76+220=352). Contrast this 352 byte size with FIGS. 4's 1064 byte size. This indexed jump table is merely an example. In other embodiments having a larger domain of messages and/or sequencer instruction locations, a larger memory savings can be achieved.

Other embodiments of the present invention are possible without departing from the scope and spirit of the present invention. Such embodiments would include using such indexed jump tables for processes other than SCSI messaging and using such indexed tables to contain information other than subroutine addresses.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

I claim:

1. In a computer system, a method for processing interface messages comprising the steps of:

implementing a multi-element sequence table wherein the table elements are index values corresponding to sequence instruction locations and have values representative of valid sequence instruction locations that expect messages and invalid sequence instruction locations that do not expect messages, the sequence table having a first number of elements;

implementing a multi-element message table wherein the table elements are index values corresponding to a list of messages and have values representative of supported interface messages and unsupported interface messages, the message table having a second number of elements; and creating a jump table indexed by the valid sequence instruction values of the sequence table and by the supported interface message values of the message table to provide the address of an appropriate message handling function call, the jump table having a third number of elements, the third number being less tan the product of the first number and the second number.

2. The method for processing interface messages, as recited in claim 1, wherein the computer system comprises a disk drive controller.

3. The method for processing bus messages, as recited in claim 1, wherein the interface messages are SCSI-type messages.

4. A disk drive device comprising:

a disk enclosure;

a disk rotatably coupled to the disk enclosure;

a disk drive controller that manages the writing of data to the disk and the reading of data from the disk, comprising an interface message processor which comprises:

a multi-element sequence table wherein the table elements are index values corresponding to sequence instruction locations and have values representative of valid sequence instruction locations that expect messages and invalid sequence instruction locations that do not expect messages, the sequence table having a first number of elements;

a multi-element message table wherein the table elements are index values corresponding to a list of messages and have values representative of supported interface messages and unsupported messages, the message table having a second number of elements; and a jump table indexed by the valid sequence instruction values of the sequence table and by the supported interface message values of the message table, to provide the address of an appropriate message handling function call, the jump table having a third number of elements, the third number being less than the product of the first number and the second number.

5. The disk drive device, as recited in claim 4, wherein the interface message processor processes SCSI-type messages.

* * * * *